Patented Jan. 26, 1954

2,667,467

UNITED STATES PATENT OFFICE 2,667,467

STYRENE COPOLYMERS

Richard R. Morner, Dayton, Ohio, assignor to Monsanto Chemical Company, St. Louis, Mo., a corporation of Delaware No Drawing. Application June 15, 1951, Serial No. 231,905

3 Claims. (Cl. 260—63)

The present invention relates to new copolymerization products of styrene.

Polystyrene is a valuable and useful article of commerce, but its industrial applications are considerably limited by the lack of adequate thermostability. Articles prepared from polystyrene cannot be washed in very hot water, or otherwise sterilized by heat, without serious distortion or complete destruction of the article.

An object of the present invention is to provide polymerization products of styrene which have improved strength particularly at elevated temperatures as compared with polystyrene itself. Another object is to provide transparent, plastic articles capable of withstanding temperatures of sterilization.

These and other objects hereinafter disclosed are provided by the following invention in which there are provided copolymers of 4-acetyl-α-methylstyrene. This compound is readily available by dehydrating 4-acetyl-α,α-dimethylbenzyl alcohol, substantially as described in the copending application of John Mann Butler, Serial No. 154,890, filed April 8, 1950, and assigned to the same assignee as is the present invention. I have found that if styrene is polymerized conjointly with 4-acetyl-α-methylstyrene transparent solid compositions of unusual thermostability are formed. It has been found that useful products may be prepared by the copolymerization of from 1 to 50 parts by weight of 4-acetyl-α-methylstyrene and 50-99 parts of styrene.

Because the use of substantial proportions of the 4-acetyl-α-methylstyrene in the copolymer may under some circumstances result in brittle products of limited application in molding operations, it is preferable not to employ more than 40% by weight of the 4-acetyl-α-methylstyrene in the monomer mixture. Furthermore it is often necessary to use a minimum of 5% of 4-acetyl-α-methylstyrene in order to achieve a substantial increase in thermostability. Thus, the preferred copolymers are formed by the copolymerization of from 5 to 40 per cent 4-acetyl-α-methylstyrene and from 60 to 95 per cent of styrene.

The present copolymers are characterized by possessing valuable thermal properties, particularly by exhibiting a pronounced ability to withstand mechanical distortion at elevated temperatures. However in spite of the resistance to distortion at elevated temperatures the present products may be molded by compression or injection methods to give molded articles useful for a variety of purposes.

For most purposes the copolymers as produced by polymerizing a mixture of styrene and the 4-acetyl-α-methylstyrene are generally employed as such for molding products without the presence of plasticizing agents. However for certain purposes I have found that the copolymers may be plasticized without seriously impairing certain of the desirable properties of the copolymers.

Polymerization of the mixtures of styrene and 4-acetyl-α-methylstyrene may be carried out by any of the usual methods of polymerization, i. e., they may be polymerized in mass, in aqueous emulsion, and in solutions. When employing mass polymerization, temperatures between 50° C. and 200° C. may be used, but generally the reactions are initiated at lower temperatures and completed at higher temperatures in order to maintain the reaction under control. The solid copolymers prepared by the mass polymerization technique may be ground into particles of the desired state of comminution and used as molding powders in the manufacture of molded articles.

When the copolymers are formed by emulsion polymerization methods the monomers are mixed in an aqueous medium and the copolymers prepared in aqueous suspension, this method generally requiring an emulsifying agent and a dispersing agent to prevent the agglomeration of the copolymers during the reaction. Suitable emulsifying agents which may be used are soap, salts of the sulfonated alkylbenzenes, tri-ethanol-amine salts, and other compounds containing both hydrophobic and hydrophilic groups.

Emulsion polymerizations may be initiated by mixing the monomers and subjecting the mixture to polymerization conditions in the presence of water and catalyst. The monomers may be charged to the reactor at the beginning of the reaction or they may be gradually added to the reactor during the course of the reaction. If desired, continuous polymerization methods may be used. When the reaction is completed the product will exist in the form of an aqueous emulsion, or a suspension of minute solid particles in an aqueous medium. In some cases the emulsion or dispersion may be filtered, but frequently it is desirable to precipitate the emulsion by destroying the emulsifying agent or to coagulate the latex by adding a salt, an acid or alcohol.

The polymerization may be carried out either in the absence or in the presence of polymerization catalyst, e. g., an oxygen-liberating or a free radical-liberating agent. From 0.005 to 1.0 per cent of the catalysts, based on the total weight of the monomer mixture, is advantageously employed. Examples of suitable catalyst are benzoyl peroxide, potassium persulfate, tert-butyl hydroperoxide or an azo compound such as $\alpha,\alpha'$-azodiisobutyronitrile. Usually it is desirable to use a catalyst which is soluble in the polymerization medium. Thus, in an aqueous medium, hydrogen peroxide, sodium percarbonate, sodium perborate, or other alkali metal salts of a peroxy acid may be used. In a non-aqueous system peroxides such as benzoyl peroxide, acetyl peroxide or other organic peroxidic compounds may be required.

The invention is illustrated, but not limited, by the following examples.

Example 1

A reaction flask was charged with 280 parts by weight of distilled water and 0.4 part of an emulsifying agent known to the trade as "Acto 450." A separately prepared catalyst solution comprising 20 parts of distilled water and 0.5 part of potassium persulfate was prepared. The contents of the reactor were stirred with a rotary stirring device operating at 225 R. P. M. The atmosphere in the reactor was swept out with nitrogen and the contents heated to reflux temperature. The reaction was initiated by adding 10 cc. of the catalyst solution and introducing a stream of 90 per cent styrene and 10 per cent 4-acetyl-α-methylstyrene. The monomers were introduced at a rate which required 30 minutes for the complete addition. After 15 minutes and again after thirty minutes 5 cc. of the catalyst solution were again added. The reaction was then heated for an additional 30 minutes at reflux temperature. The mixture was then steam distilled to recover any unreacted monomer. The resulting emulsion was cooled, filtered and frozen. After thawing the product was readily separated by filtration, dried and ground to a finely divided molding powder.

A 2% dioxane solution of the copolymer was found to have a viscosity of 7.17 cps. The heat-distortion point, determined upon a molded bar of the copolymer according to the ASTM method using an Aminco oil-bath heat-distortion apparatus, was 107.5° C. The heat-distortion point of a similarly prepared polystyrene, as determined by the same testing procedure was found to be 98° C.

Example 2

A reaction flask was charged with 200 parts by weight of distilled water, 0.6 parts of an emulsifying agent known to the trade as "Acto 450" (reputed to be a petroleum mahogany sulfonate), and 0.1 part of sodium bicarbonate. A separate catalyst solution was prepared by dissolving 0.18 part of potassium persulfate in 36 parts of distilled water. Over a period of three hours and 30 minutes 75 parts of styrene and 25 parts of 4-acetyl-α-methylstyrene were added gradually while continuously stirring in an atmosphere of nitrogen and maintaining the reactants at reflux temperature. Steam distillation of the resulting reaction mixture gave 1.5 cc. of unreacted monomers, showing substantially complete participation of the 4-acetyl-α-methylstyrene in the polymerization. The solid polymer was separated from the emulsion by freezing and thawing prior to filtration. The copolymer had a softening point of 130° C., a melting point of 205° C. and a decomposition point of 235° C. The heat-distortion point of the copolymer, determined as in Example 1, was found to be 106° C. A molded test specimen of the copolymer was found to have the following strength characteristics:

Tensile strength _____ p. s. i__ 6750
Flexural strength _____ p. s. i__ 9750
Izod impact strength
  (unnotched) _____ ft. lbs./in__ 2.1

The above values for tensile and flexural strengths were obtained by ASTM methods. Evaluation of the impact strength was made by employing a modification of the cantilever beam (Izod) impact machine known as the Baldwin-Southwark machine, employing ASTM procedure.

Example 3

A mixture consisting of 30 g. of styrene, 10 g. of 4-acetal-α-methylstyrene and 0.1 g. of $\alpha,\alpha'$-azodiisobutyronitrile was mass polymerized in a dry, nitrogen atmosphere at a temperature of 60° C. for 16.5 hours, 100° C. for 145 hours, 150° C. for 23 hours and 175° C. for 8 hours. The resulting copolymer was a transparent, substantially colorless solid of improved thermal stability.

Other modes of applying the principle of my invention may be employed instead of those explained, change being made as regards the polymerization process, the temperature, time or polymerization and proportion of monomeric reactants employed.

What I claim is:

1. A copolymer of 50–99 per cent by weight of styrene and from 1 to 50 per cent of 4-acetyl-α-methylstyrene.

2. The process of forming a styrene copolymer which comprises heating a mixture of from 50–99% by weight of styrene and from 1 to 50% of 4-acetyl-α-methylstyrene, and recovering said copolymer from the resulting product.

3. The process of preparing a styrene copolymer which comprises subjecting a mixture of from 50–99% styrene and from 1 to 50% of 4-acetyl-α-methylstyrene to heat in the presence of a peroxidic catalyst and recovering said copolymer from the resulting product.

RICHARD R. MORNER.

No references cited